(12) United States Patent
Seki

(10) Patent No.: US 10,070,493 B2
(45) Date of Patent: Sep. 4, 2018

(54) LIGHTING DEVICE, LUMINAIRE, AND SIGNBOARD

(71) Applicant: Panasonic Intellectual Property Management Co., Ltd., Osaka (JP)

(72) Inventor: Keisuke Seki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/869,439

(22) Filed: Jan. 12, 2018

(65) Prior Publication Data

US 2018/0220504 A1   Aug. 2, 2018

(30) Foreign Application Priority Data

Jan. 30, 2017   (JP) ................. 2017-014872

(51) Int. Cl.
| | |
|---|---|
| *H05B 33/08* | (2006.01) |
| *H04B 10/116* | (2013.01) |
| *H05B 37/02* | (2006.01) |
| *G09F 13/00* | (2006.01) |

(Continued)

(52) U.S. Cl.
CPC ....... *H05B 33/0845* (2013.01); *G09F 13/005* (2013.01); *H04B 10/116* (2013.01); *H05B 33/0815* (2013.01); *F21S 8/02* (2013.01); *F21V 23/008* (2013.01)

(58) Field of Classification Search
CPC .......................... H05B 33/08; H05B 33/0809; H05B 33/0812; H05B 33/0815; H05B 33/0842; H05B 33/0845; H05B 33/0887; H05B 37/02; H05B 37/0272; H05B 37/029; H05B 41/3925; H05B 41/2828; G09F 13/005; H04B 10/116; F21S 8/02; F21V 23/008
USPC .... 315/151–159, 185 R, 224, 291, 297, 307, 315/308
See application file for complete search history.

(56) References Cited

U.S. PATENT DOCUMENTS

| | | | |
|---|---|---|---|
| 9,294,189 B2 * | 3/2016 | Kido | .................. H05B 37/0272 |
| 2013/0015784 A1 | 1/2013 | Kamada | |
| 2013/0015785 A1 | 1/2013 | Kamada | |

(Continued)

FOREIGN PATENT DOCUMENTS

| | | |
|---|---|---|
| JP | 2013-26690 | 2/2013 |
| JP | 2013-26691 | 2/2013 |

(Continued)

*Primary Examiner* — Jimmy Vu
(74) *Attorney, Agent, or Firm* — Renner Otto Boisselle & Sklar, LLP

(57) ABSTRACT

A lighting device which supplies a light-emitting element with a current modulated based on a visible light communication signal includes: a DC power supply circuit which supplies the light-emitting element with a first voltage that is a DC voltage; and a current control circuit which (i) includes a current control element connected in series to the light-emitting element, (ii) switches the current control element between a first state and a second state based on the visible light communication signal, the first state and the second state differing in electrical impedance, and (iii) adjusts, to a constant current value corresponding to a constant current instruction signal, a current flowing through the light-emitting element in a period in which the current control element is in the first state, by controlling the current control element.

15 Claims, 12 Drawing Sheets

(51) Int. Cl.
*F21S 8/02* (2006.01)
*F21V 23/00* (2015.01)

(56) References Cited

U.S. PATENT DOCUMENTS

| | | |
|---|---|---|
| 2014/0159586 A1 | 6/2014 | Kido |
| 2014/0286645 A1 | 9/2014 | Kido |
| 2014/0334826 A1 | 11/2014 | Kido |
| 2015/0098708 A1 | 4/2015 | Kido |
| 2015/0263808 A1 | 9/2015 | Kondo |
| 2016/0072583 A1 | 3/2016 | Naruo |
| 2016/0150611 A1 | 5/2016 | Himeda |

FOREIGN PATENT DOCUMENTS

| | | |
|---|---|---|
| JP | 2013-026692 | 4/2013 |
| JP | 2013-110634 | 6/2013 |
| JP | 2013-110636 | 6/2013 |
| JP | 2014-135716 | 7/2014 |
| JP | 2014-216196 | 11/2014 |
| JP | 2015-076684 | 4/2015 |
| JP | 2015-177213 | 10/2015 |
| JP | 2016-058148 | 4/2016 |
| JP | 2016-100164 | 5/2016 |

\* cited by examiner

LIGHTING DEVICE, LUMINAIRE, AND SIGNBOARD

CROSS REFERENCE TO RELATED APPLICATION

This application claims the benefit of priority of Japanese Patent Application Number 2017-014872 filed on Jan. 30, 2017, the entire content of which is hereby incorporated by reference.

BACKGROUND

1. Technical Field

The present disclosure relates to lighting devices, luminaires, and signboards, and in particular to a lighting device which supplies a light-emitting element with a current modulated based on a visible light communication signal.

2. Description of the Related Art

Patent Literature (PTL) 1 (Japanese Unexamined Patent Application Publication No. 2016-100164) discloses a lighting device and a luminaire including a constant current circuit. Meanwhile, lighting devices and luminaires compatible with visible light communication have been considered.

SUMMARY

For such lighting devices and luminaires, a reduction of an increase in components of circuits for compatibility with visible light communication is demanded.

In view of this, the present disclosure has an object to provide a lighting device, a luminaire, or a signboard which is capable of reducing the increase in the components of the circuits.

A lighting device according to one aspect of the present disclosure is a lighting device which supplies a light-emitting element with a current modulated based on a visible light communication signal, the lighting device including: a DC power supply circuit which supplies the light-emitting element with a first voltage that is a DC voltage; and a current control circuit which (i) includes a current control element connected in series to the light-emitting element, (ii) switches the current control element between a first state and a second state based on the visible light communication signal, the first state and the second state differing in electrical impedance, and (iii) adjusts, to a constant current value corresponding to a constant current instruction signal, a current flowing through the light-emitting element in a period in which the current control element is in the first state, by controlling the current control element.

The present disclosure makes it possible to provide a lighting device, a luminaire, or a signboard which is capable of reducing the increase in the components of the circuits.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure will be described with reference to the drawings. Each of the embodiments described below shows a specific example of the present disclosure. Therefore, numerical values, shapes, materials, structural components, the arrangement and connection of the structural components, etc. shown in the following embodiments are mere examples, and are not intended to limit the scope of the present disclosure. Accordingly, among the structural components in the following embodiments, structural components not recited in any one of the independent claims which indicate the broadest concepts of the present disclosure are described as optional structural components.

It should be noted that the figures are schematic diagrams and are not necessarily precise illustrations. Moreover, in the figures, substantially identical components are assigned the same reference signs, and overlapping description thereof is omitted or simplified.

Embodiment 1

[Configuration of Luminaire]

Figure 1:
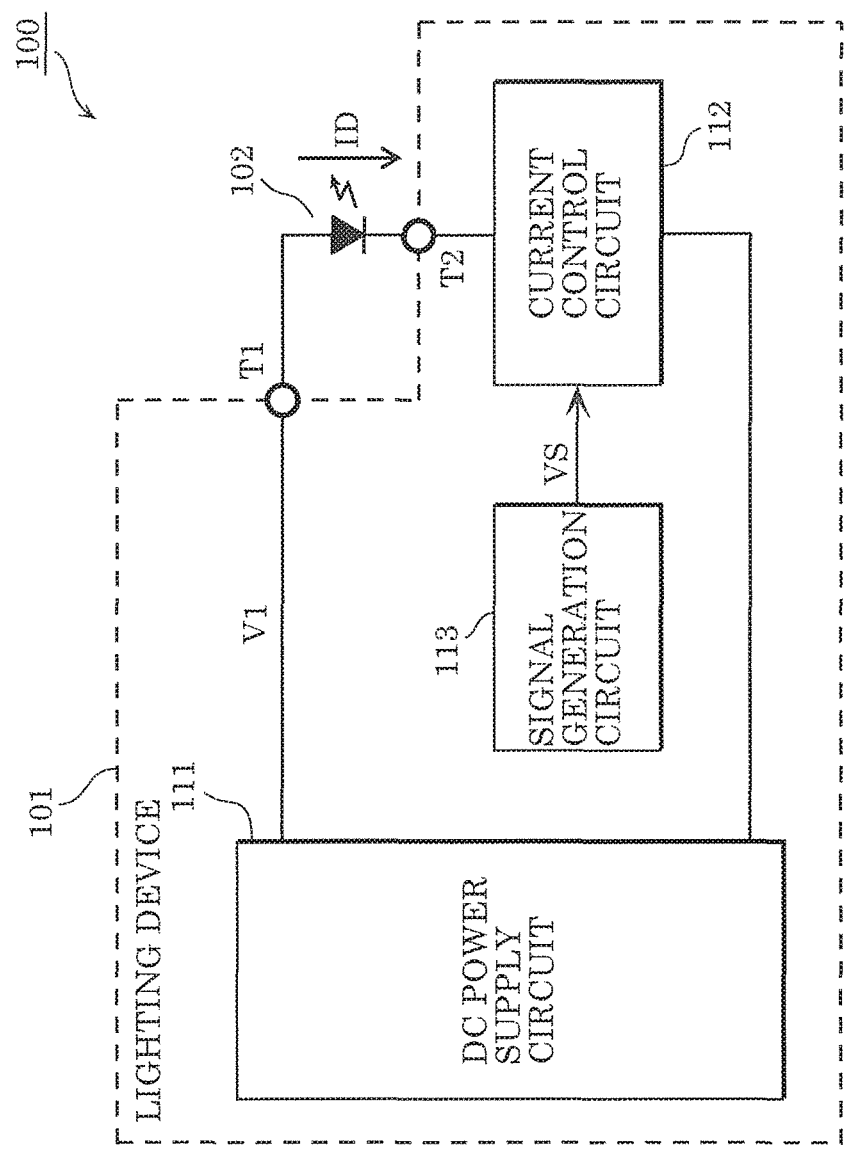
FIG. 1 is a diagram illustrating an exemplary configuration of a luminaire according to Embodiment 1.

First, a configuration of luminaire 100 according to Embodiment 1 will be described. FIG. 1 is a diagram illustrating the configuration of luminaire 100 according to Embodiment 1. As illustrated in FIG. 1, luminaire 100 includes lighting device 101 and light-emitting element 102.

Light-emitting element 102 is a solid light-emitting element, and is, for example, a light-emitting diode (LED). It should be noted that although only one light-emitting element 102 is connected between terminal T1 and terminal T2 in FIG. 1, light-emitting elements 102 may be connected in series or parallel.

Lighting device 101 supplies light-emitting element 102 with a current modulated based on a visible light communication signal. Lighting device 101 includes direct-current (DC) power supply circuit 111, current control circuit 112, and signal generation circuit 113.

DC power supply circuit 111 supplies light-emitting element 102 with substantially constant DC voltage V1 (first voltage) or a current. For example, DC power supply circuit 111 is a circuit which converts alternating-current (AC) power supplied by a commercial power source into DC power, and supplies a constant voltage using the converted DC power. DC power supply circuit 111 includes, for example, an AC/DC converter and a DC/DC converter.

Current control circuit 112 adjusts current ID flowing through light-emitting element 102 to a constant value. Signal generation circuit 113 generates control signal VS and supplies the generated control signal to current control circuit 112.

[Configuration of and Operation by Lighting Device]

Figure 2:
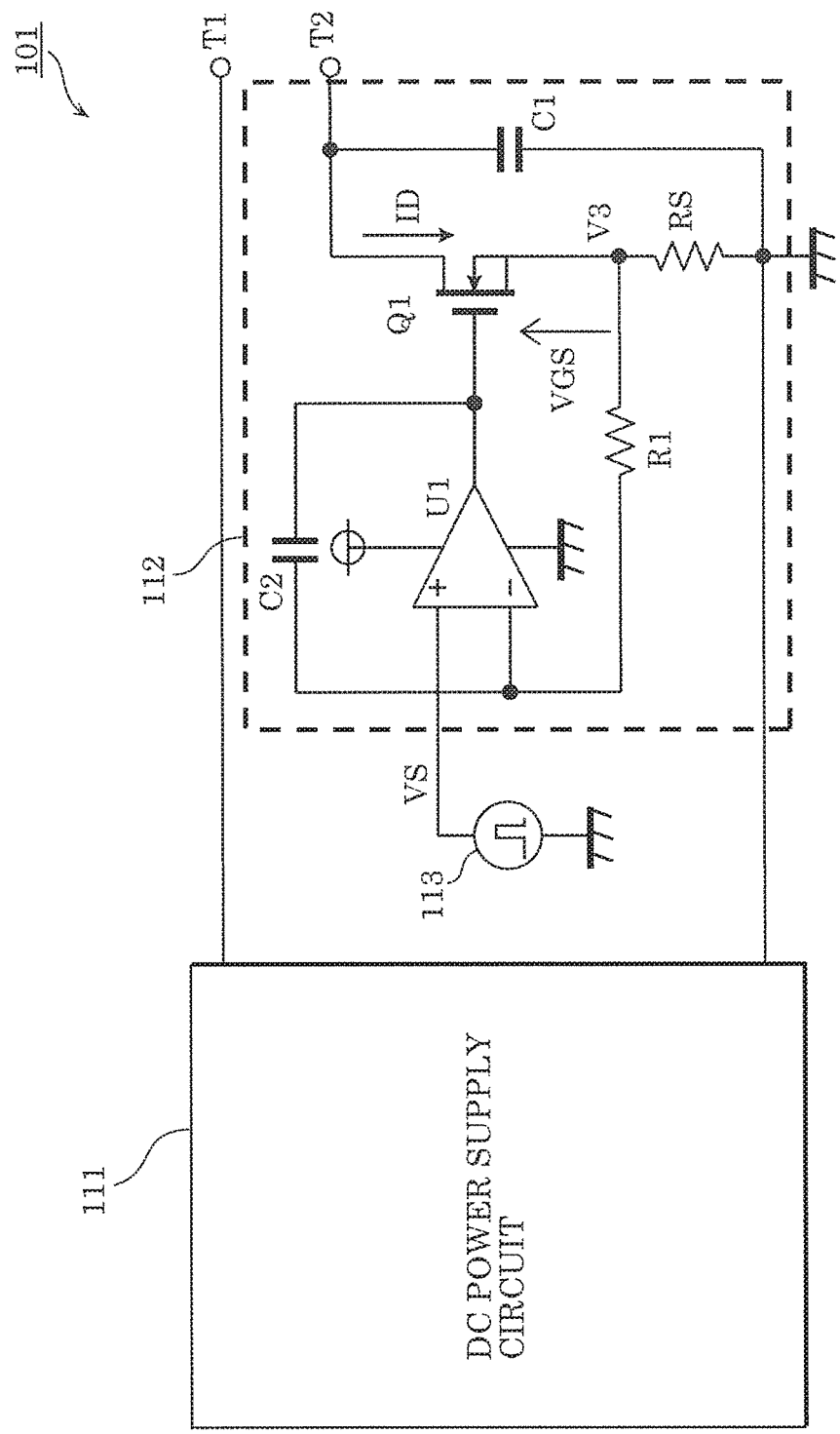
FIG. 2 is a diagram illustrating a configuration of a lighting device according to Embodiment 1.

FIG. 2 is a diagram illustrating an exemplary configuration of lighting device 101. Current control circuit 112 causes current ID flowing through light-emitting element 102 to become a constant current value corresponding to a voltage value of control signal VS. Current control circuit 112 includes current control element Q1, amplifier U1, resistors RS and R1, and capacitors C1 and C2.

Current control element Q1 is, for example, a switch such as a MOS transistor, and is connected in series to light-emitting element 102 via terminal T2. In addition, current control element Q1 is used to adjust current ID flowing through light-emitting element 102. Current control element Q1 operates in a saturation region, and current ID is controlled according to gate voltage Vgs.

It should be noted that current ID is a current flowing through light-emitting element 102, current control element Q1, and resistor RS as well as an output current of DC power supply circuit 111.

Resistor RS is a current detection element for detecting current ID flowing through light-emitting element 102 and current control element Q1, and is connected in series to current control element Q1.

Amplifier U1 is, for example, an operational amplifier (error amplifier), and amplifies a difference between current signal V3 detected by resistor RS and control signal VS. Specifically, amplifier U1 has an inverting input terminal connected via resistor R1 to a node between resistor RS and current control element Q1. Control signal VS is provided to a non-inverting input terminal of amplifier U1. Amplifier U1 has an output terminal connected to a gate terminal which is a control terminal of current control element Q1. In consequence, a current flowing through current control element Q1 is adjusted according to an output signal of amplifier U1.

Figure 3:
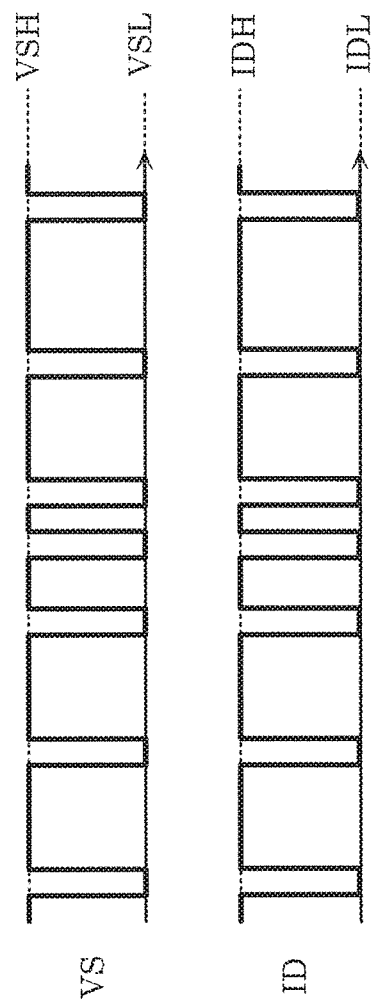
FIG. 3 is a timing diagram illustrating an operation performed by the luminaire according to Embodiment 1.

FIG. 3 is a diagram illustrating control signal VS and current ID. Control signal VS switches between a high level and a low level with timing based on a visible light communication signal, and has high-level voltage value VSH corresponding to a constant current instruction signal. Here, the constant current instruction signal is a signal corresponding to a value of a constant current flowing through light-emitting element 102, that is, a signal corresponding to a constant current value to be adjusted by current control element Q1. In other words, control signal VS is a signal obtained by superimposing the visible light communication signal on the constant current instruction signal.

Here, a voltage of the non-inverting input terminal of amplifier U1 and a voltage of the inverting input terminal of the same are made equal by controlling voltage VGS, by negatively feeding back current ID. In other words, since the controlling is performed to hold VS=ID×RS, current ID is calculated as ID=VS/RS. Moreover, because the visible light communication signal is superimposed on control signal VS, as illustrated in FIG. 3, current ID is also modulated in the same manner as control signal VS. Accordingly, the visible light communication signal is superimposed on light to be emitted by light-emitting element 102.

As above, current control circuit 112 controls current control element Q1 according to control signal VS. Specifically, current control circuit 112 turns on and off current control element Q1 based on visible light communication signal VC, and adjusts current ID flowing through light-emitting element 102 in a period in which current control element Q1 is on, to constant current value IDH corresponding to constant current instruction signal VSH, by controlling current control element Q1.

For example, in FIG. 3, voltage low-level value VSL of control signal VS is zero, and at that time current value IDS is zero. It should be noted that voltage value VSL and current value IDL may not be zero. In other words, current control circuit 112 may switch current control element Q1 between a first state and a second state which differ in electrical impedance, based on visible light communication signal VC, and may adjust current ID flowing through light-emitting element 102 in a period in which current control element Q1 is in the first state to constant current value IDH corresponding to constant current instruction signal VSH, by controlling current control element Q1. Here, the first state is a state which has lower electrical impedance than the second state does and in which more current flows than in the second state.

Moreover, resistor R1 and capacitors C1 and C2 are phase compensating elements which prevent the oscillation of amplifier U1 and improve the stability of a feedback loop. Accordingly, instead of these elements, a circuit may be used which is obtained by connecting electrical impedance elements such as resistors and capacitors in series or parallel. In addition, at least one of resistor R1 and capacitors C1 and C2 need not be included in current control circuit 112.

As above, lighting device 101 according to Embodiment 1 performs a switching control for superimposing a visible light communication signal, using current control element Q1 for a constant current control. In other words, current control element Q1 for the constant current control is used for the superimposition of the visible light communication signal. Accordingly, compared to a case in which a switching element etc. is newly added for the superimposition of the visible light communication signal, it is possible to reduce an increase in components of circuits.

Figure 4:
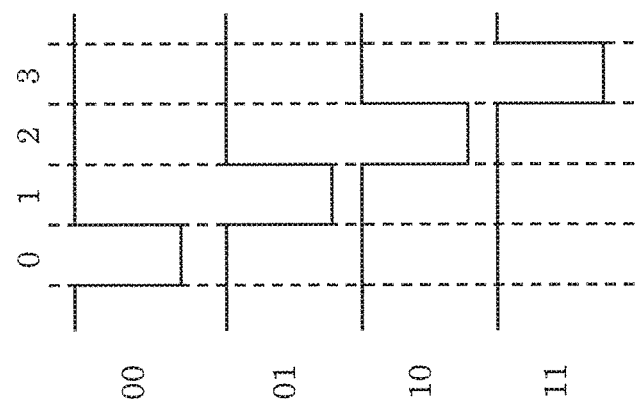
FIG. 4 is a diagram illustrating an example of a modulation method for a visible light communication signal according to Embodiment 1.

Moreover, in Embodiment 1, the visible light communication signal is generated which causes an average current value of current ID to be constant. Specifically, in order to reduce a change of a light output due to a change of a bit sequence, the visible light communication signal is generated using pulse-position modulation (PPM) having an N (an integer greater than or equal to two) value. For example, in 4 PPM, two bits are expressed by one symbol having a certain time length (see FIG. 4). This makes a ratio between a high interval and a low interval in the certain time length constant, and thus the average value of the output current becomes constant regardless of signals.

[Configuration of Signal Generation Circuit]

Figure 5:
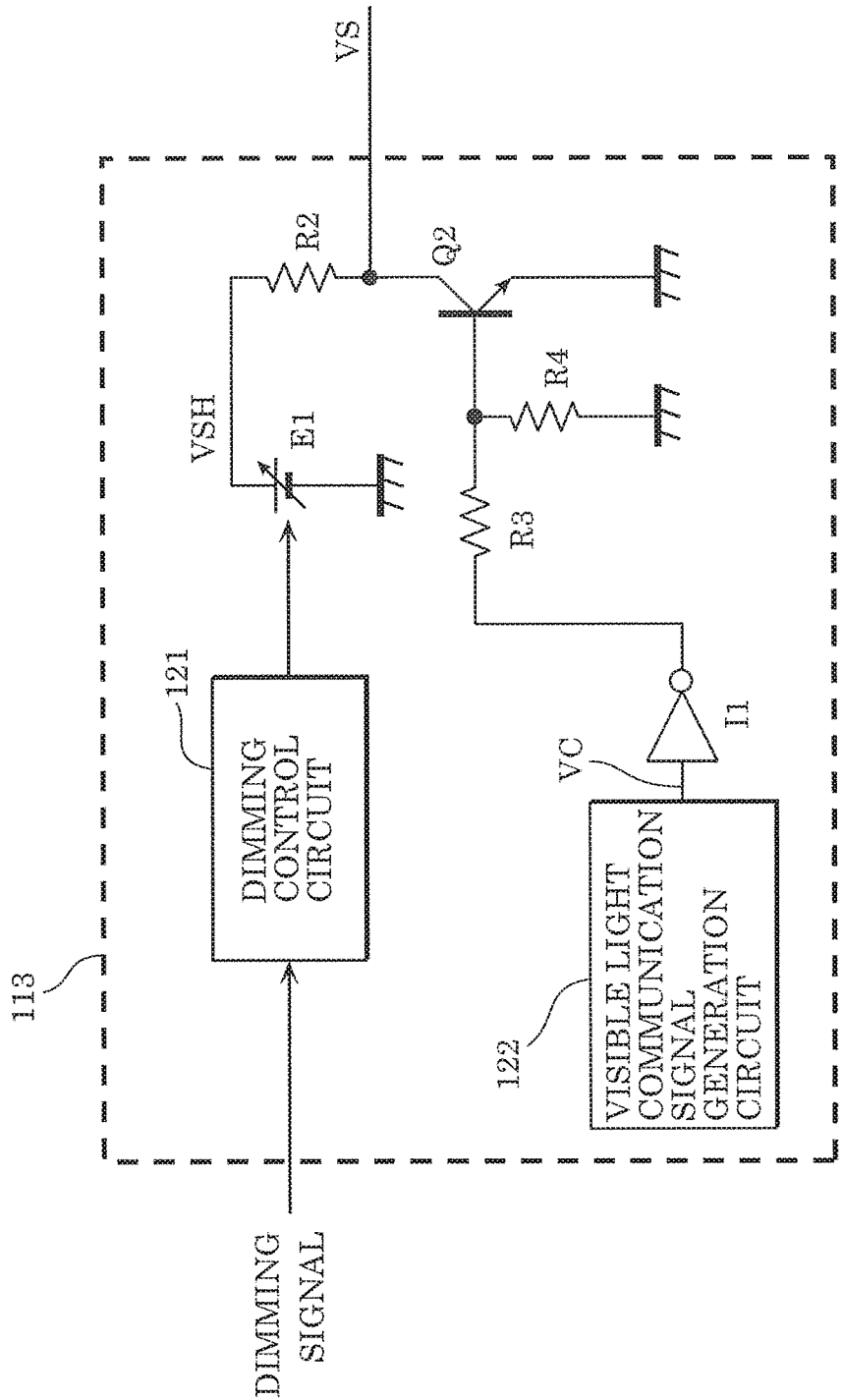
FIG. 5 is a diagram illustrating an exemplary configuration of a signal generation circuit according to Embodiment 1.

FIG. 5 is a diagram illustrating an exemplary configuration of signal generation circuit 113. Signal generation circuit 113 illustrated in FIG. 5 changes high-level voltage value VSH of control signal VS based on a dimming signal. Signal generation circuit 113 includes dimming control circuit 121, visible light communication signal generation circuit 122, transistor Q2, variable voltage source E1, and resistors R2, R3, and R4.

Dimming control circuit 121 adjusts voltage value VSH by controlling variable voltage source E1 according to a dimming signal. Here, the dimming signal refers to a signal for a dimming control used by conventional luminaires, and examples of the dimming signal include a pulse-width modulation (PWM) signal, digital addressable lighting interface (DALI) signal, and a phase control signal.

Visible light communication signal generation circuit 122 generates visible light communication signal VC.

When visible light communication signal VC is high level, transistor Q2 is turned off and VS=VSH. In contrast, when visible light communication signal VC is low level, transistor Q2 is turned on and VS=0 (GND).

Moreover, ID=VS/RS is held as described above. Consequently, VSH changes according to the dimming signal, which makes it possible to change current ID. In other words, it is possible to control a brightness according to the dimming signal.

It should be noted that although the example in which the dimming control is performed according to the dimming signal has been described above, the dimming control need not be performed. In other words, the constant current instruction signal and voltage value VSH may be fixed values.

Moreover, a signal line for setting whether to dim may be provided to lighting device 101. When the signal line is connected to one of power supply lines, a dimming signal is generated and gradual dimming is performed. In addition, when the signal line is not connected to one of the power supply lines, dimming is not performed and illumination is always performed at the maximum brightness. It should be noted that the relationship between the presence or absence of the connection of the signal line and a mode to be selected may be reversed.

[Configuration of DC Power Supply Circuit]

Figure 6:
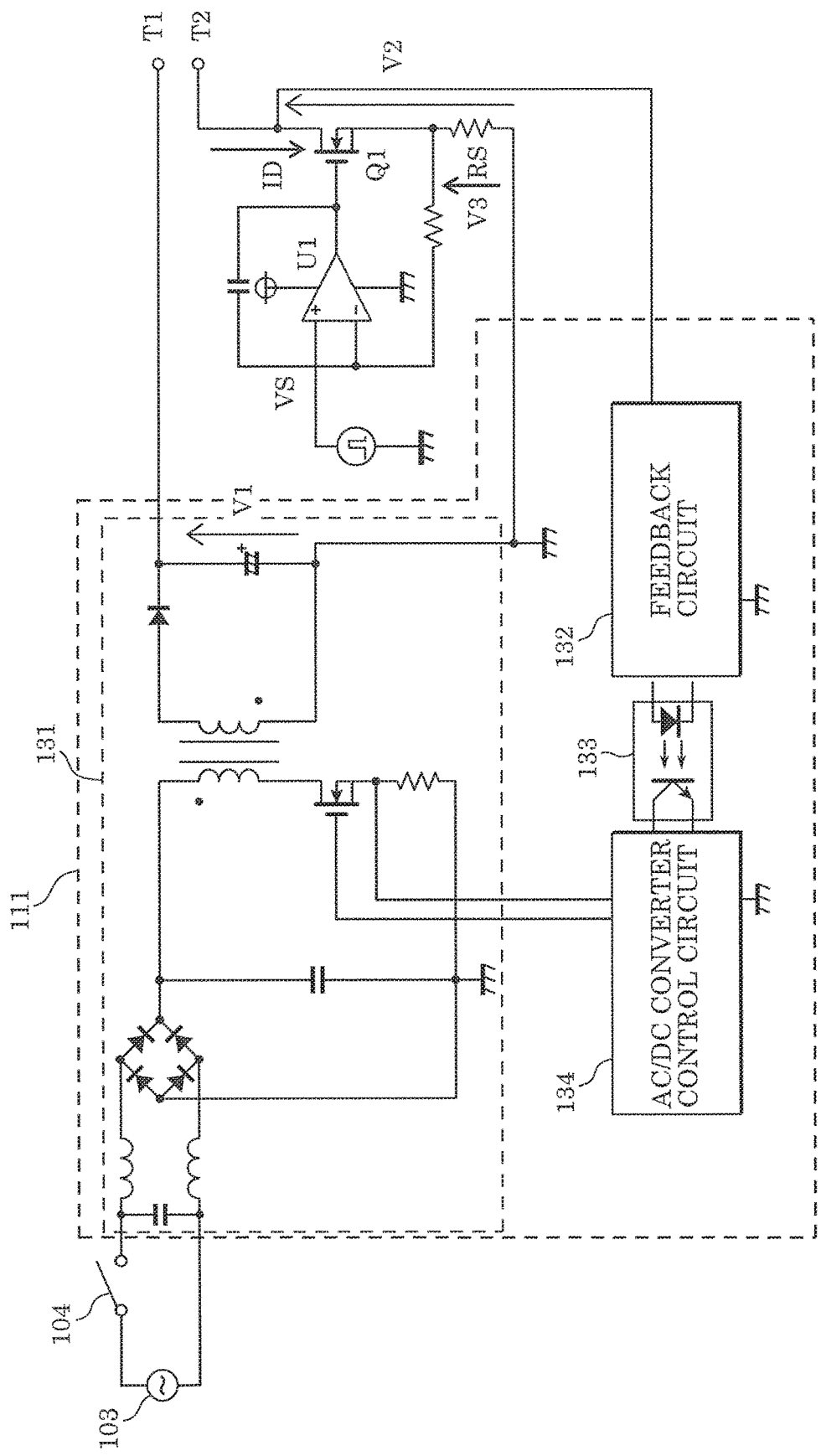
FIG. 6 is a diagram illustrating an exemplary configuration of a DC power supply circuit according to Embodiment 1.

FIG. 6 is a diagram illustrating an exemplary configuration when DC power supply circuit 111 includes a flyback circuit. As illustrated in FIG. 6, DC power supply circuit 111 includes AC/DC converter 131, feedback circuit 132, photocoupler 133, and AC/DC converter control circuit 134. Moreover, DC power supply circuit 111 is connected to commercial power source 103 via switch 104 such as a wall switch.

AC/DC converter 131 converts AC power supplied by commercial power source 103 into DC power.

AC/DC converter control circuit 134 makes voltage V2 constant by controlling a primary switching element of AC/DC converter 131. Here, the term constant refers to making an average current per predetermined period constant which differs from the above-described constant current control by current control circuit 112 in time constant.

Feedback circuit 132 is a circuit which makes output voltage V1 of DC power supply circuit 111 substantially constant by feeding back voltage V2 on a secondary side to AC/DC converter control circuit 134. Feedback circuit 132 transmits a signal corresponding to voltage V2 to AC/DC converter control circuit 134 via photocoupler 133.

With the above configuration, DC power supply circuit 111 causes voltage V2 (second voltage) at a node between light-emitting element 102 and current control element Q1 to be a constant value by supplying voltage V1 (first voltage). Accordingly, while a forward voltage having a high load is dealt with, a loss in current control element Q1 can be kept to a minimum. Here, a load voltage (forward voltage) is constant, and thus voltage V1 becomes constant if voltage V2 is constant.

In particular, when input power of at least 25 W is used, it is desirable that high-frequency current limiting be dealt with by performing a power factor correction (PFC) control. For example, the above-described circuit can be used in designing an AC/DC converter corresponding to a broad input voltage in a range of from, for example, 100 V to 242 V.

[Operation Waveform]

Figure 7:
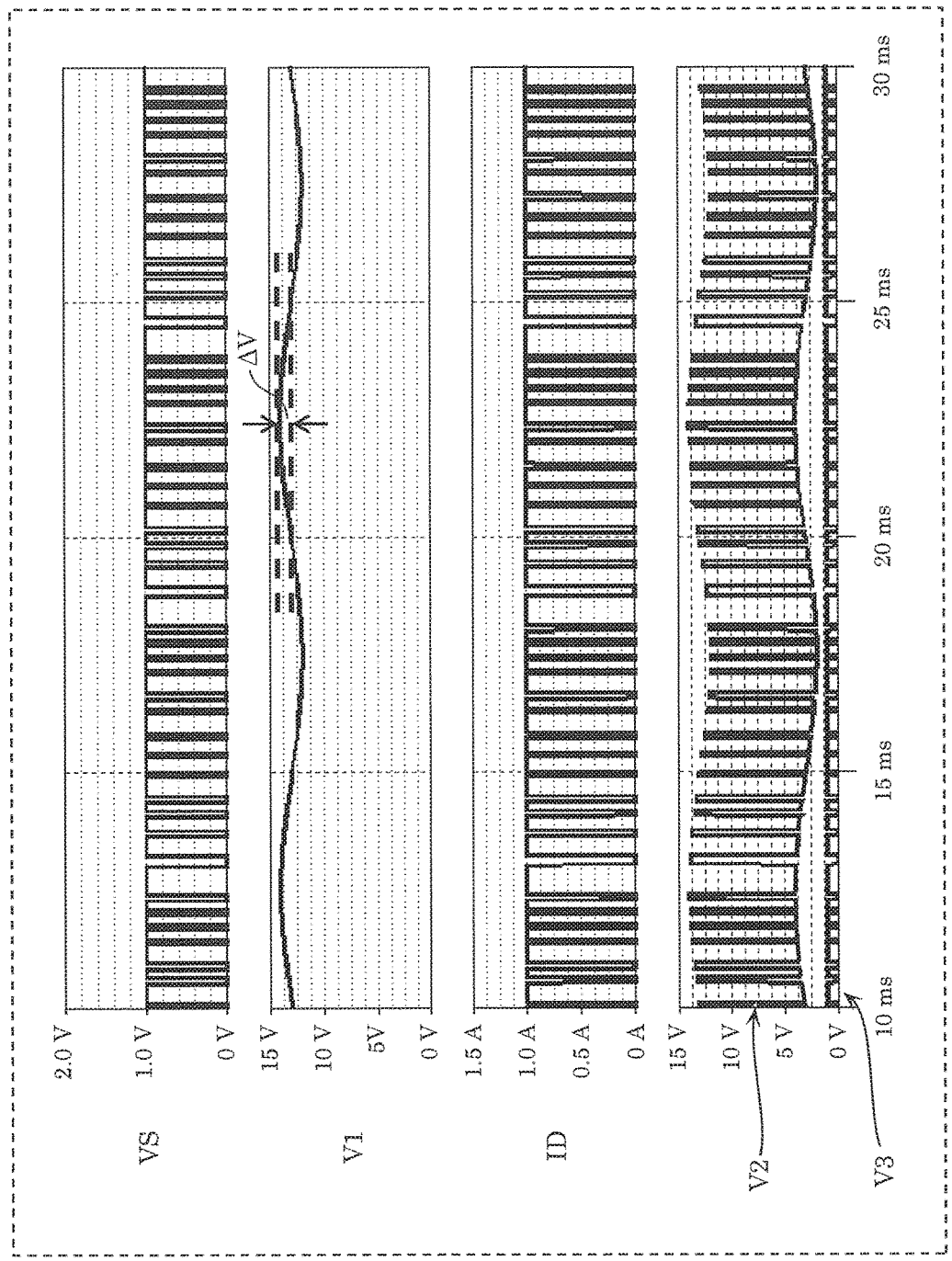
FIG. 7 is a timing diagram illustrating an operation performed by the luminaire according to Embodiment 1.

FIG. 7 is a graph illustrating an operation waveform of each signal. Voltage V1 includes a pulsating voltage having twice as many frequency components as an AC signal of commercial power source 103. Voltage V2 also includes the pulsating voltage. Here, because the pulsating voltage is absorbed into a drain voltage of current control element Q1 that is an MOS transistor, it is possible to reduce the absorption of the pulsating voltage into current ID. As a result, it is possible to reduce a lighting flicker and a video flicker. In addition, the lighting flicker becomes unperceivable to the human eyes by modulating a visible light communication signal with a sufficiently high frequency (e.g., at least 1 kHz).

It should be noted that in order to absorb the pulsating voltage as above, voltage V2 when current control element Q1 is conducted needs to be greater than amplitude $\Delta V$ of the pulsating voltages of voltages V1 and V2. In other words, DC power supply circuit 111 supplies voltage V1 which causes voltage V2 to be greater than amplitude $\Delta V$ of the pulsating voltage of voltage V1.

[Variation of DC Power Supply Circuit]

Figure 8:
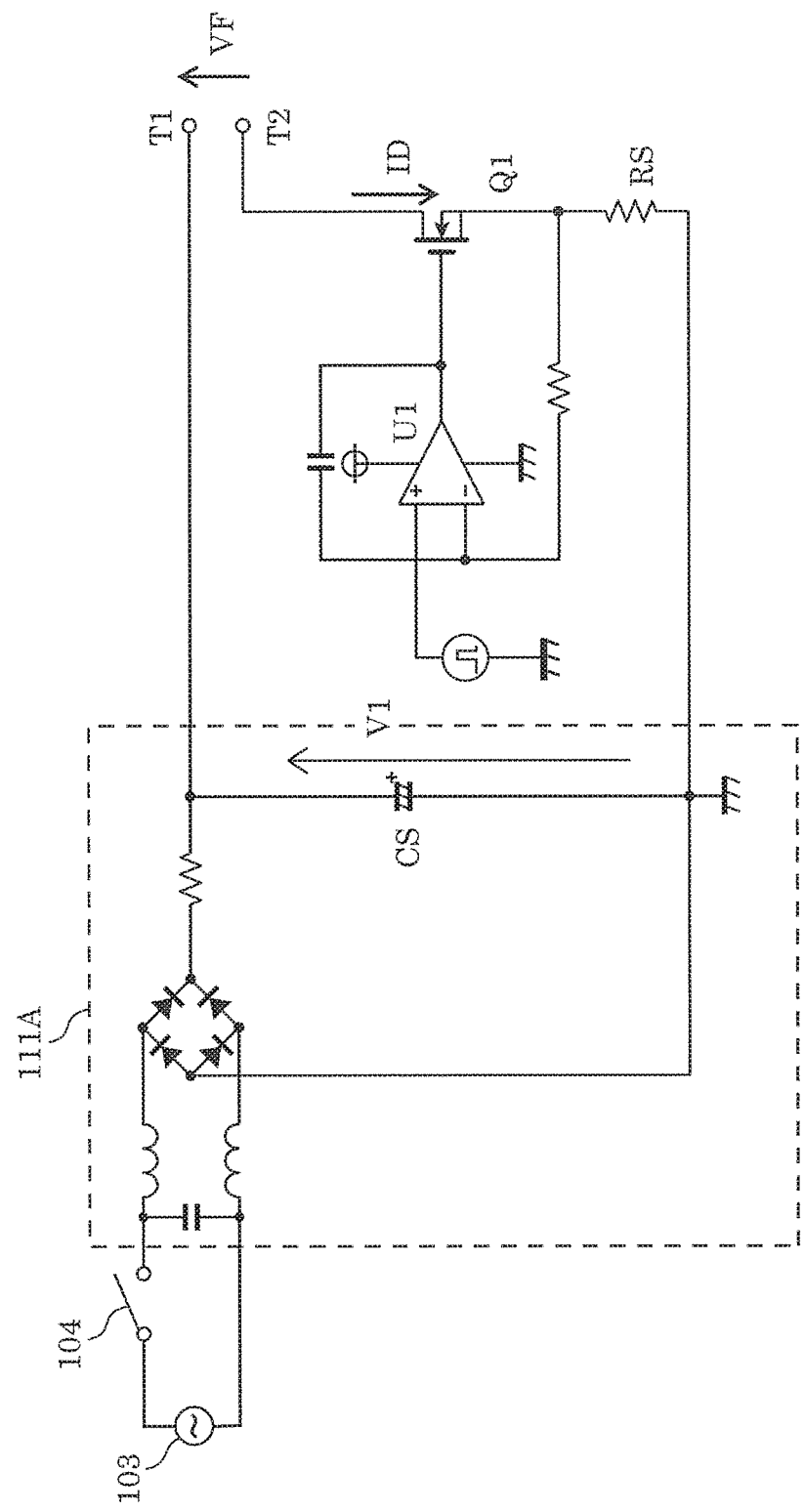
FIG. 8 is a diagram illustrating a variation of the configuration of the DC power supply circuit according to Embodiment 1.

It should be noted that the configuration of DC power supply circuit 111 is not limited to the above-described configuration. In addition, DC power supply circuit 111 need not include a switching converter. For example, like DC power supply circuit 111A illustrated in FIG. 8, a circuit may be used which is obtained by combining a full-wave rectifying circuit and a smoothing circuit including a capacitor. The circuit illustrated in FIG. 8 makes it possible to decrease the number of components, which reduces costs.

Moreover, it is possible to cause current ID not to include a ripple amplitude by using light-emitting element 102 having a forward voltage lower than a voltage including a ripple voltage of smoothing capacitor CS. As a result, it is possible to reduce a lighting flicker and a video flicker.

Furthermore, a main loss in the circuit is a loss in a constant current circuit caused by a difference between voltage V1 and forward voltage VF. Accordingly, the loss is reduced by using light-emitting element 102 having forward voltage VF close to voltage V1.

Embodiment 2

Figure 9:
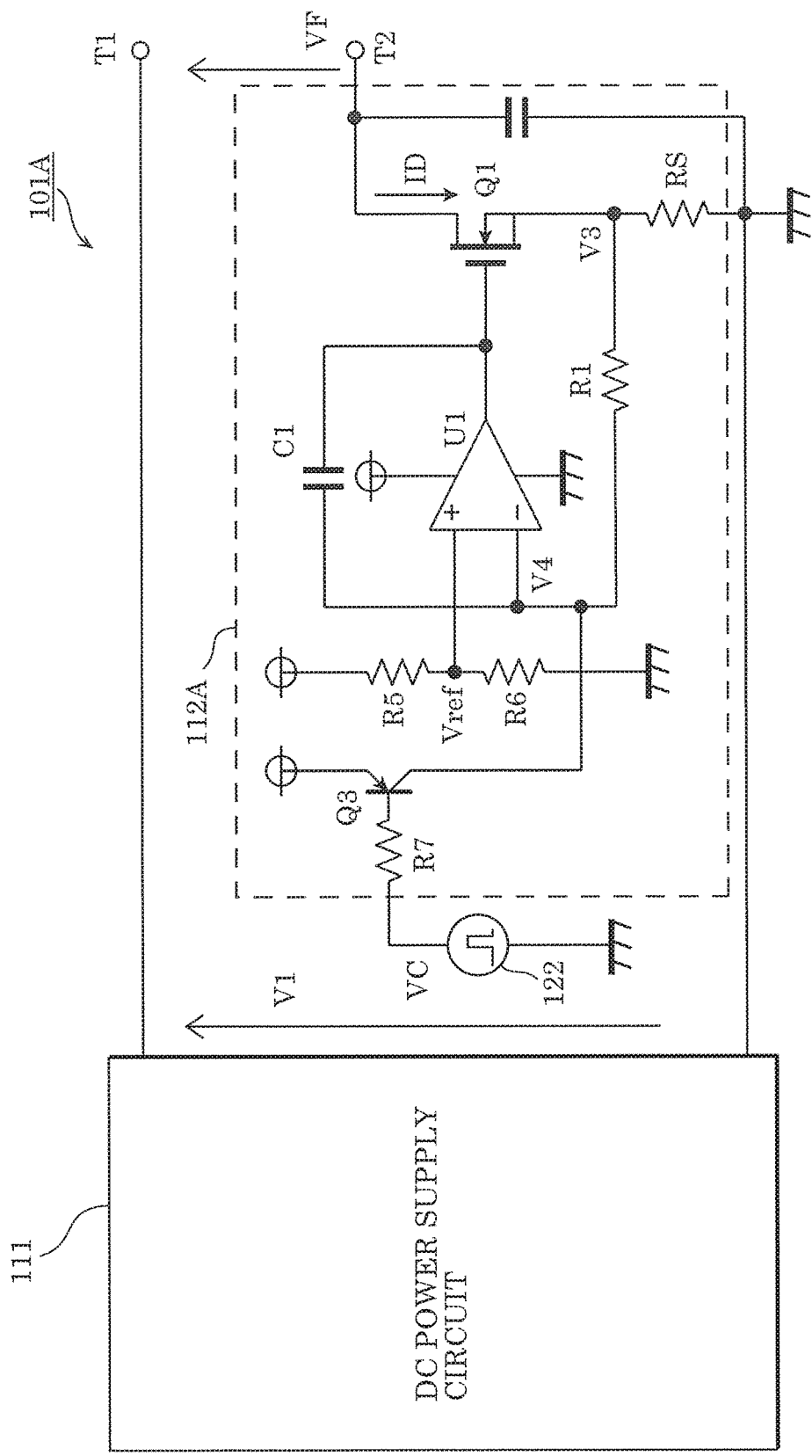
FIG. 9 is a diagram illustrating a configuration of a lighting device according to Embodiment 2.

A variation of lighting device 101 according to Embodiment 1 will be described in Embodiment 2. FIG. 9 is a diagram illustrating a configuration of lighting device 101A according to Embodiment 2. It should be noted that the following mainly describes differences from Embodiment 1.

Lighting device 101A illustrated in FIG. 9 includes current control circuit 112A having a different configuration from the configuration of current control circuit 112. Specifically, current control circuit 112A further includes resistors R5, R6, and R7 and transistor Q3.

Moreover, current control circuit 112A is supplied with visible light communication signal VC generated by visible light communication signal generation circuit 122, instead of control signal VS.

Resistors R5 and R6 generate constant current instruction signal Vref by voltage division. Here, constant current instruction signal Vref corresponds to voltage value VSH described in Embodiment 1, and is a signal corresponding to a value of a constant current flowing through light-emitting element 102.

Amplifier U1 amplifies a difference between constant current instruction signal Vref and signal V4 obtained by superimposing visible light communication signal VC on current signal V3 detected by resistor RS. Specifically, visible light communication signal VC is supplied via resistor R7 to a base terminal of transistor Q3. Moreover, transistor Q3 has a collector terminal connected to the inverting input terminal of amplifier U1. Furthermore, constant current instruction signal Vref is supplied to the non-inverting input terminal of amplifier U1.

With this configuration, when visible light communication signal VC is high level, transistor Q3 is turned off. In consequence, the inverting input terminal of amplifier U1 is directly supplied with current signal V3. As a result, a constant current control according to constant current instruction signal Vref is performed.

In contrast, when visible light communication signal VC is low level, the inverting input terminal of amplifier U1 is fixed to a high-level voltage higher than constant current instruction signal Vref by transistor Q3 being turned on. Accordingly, an output signal of amplifier U1 is fixed at a low level, and transistor Q3 is turned off.

In other words, Embodiment 2 makes it possible to achieve the same operation and advantageous effects as Embodiment 1. Moreover, a reference voltage circuit having high accuracy or stability may be used for constant current instruction signal Vref. As a result, it is possible to reduce a variation in output current or improve stability.

It should be noted that although FIG. 9 illustrates the example in which constant current instruction signal Vref is a fixed value, as described in Embodiment 1, constant current instruction signal Vref may be changed according to a dimming signal.

Embodiment 3

Luminaire 100 and signboard 150 including lighting device 101 described in Embodiment 1 or lighting device 101A described in Embodiment 2 will be described in Embodiment 3.

[Example of Luminaire]

Figure 10:
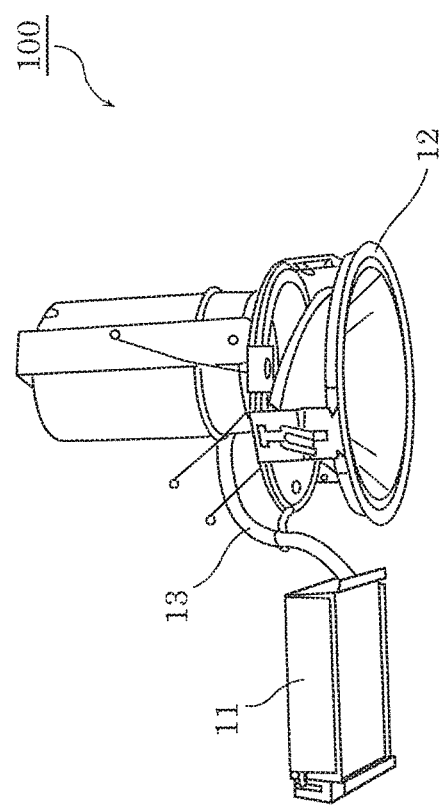
FIG. 10 is a schematic diagram illustrating an appearance of a luminaire according to Embodiment 3.

FIG. 10 is an external view of luminaire 100 described in Embodiment 1. FIG. 10 illustrates an example in which luminaire 100 is applied to a downlight. Luminaire 100 includes circuit box 11, lamp body 12, and wire 13.

Circuit box 11 houses above-described lighting device 101, and an LED (light-emitting element 102) is attached to lamp body 12. Moreover, wire 13 electrically connects circuit box 11 and lamp body 12.

Figure 11:
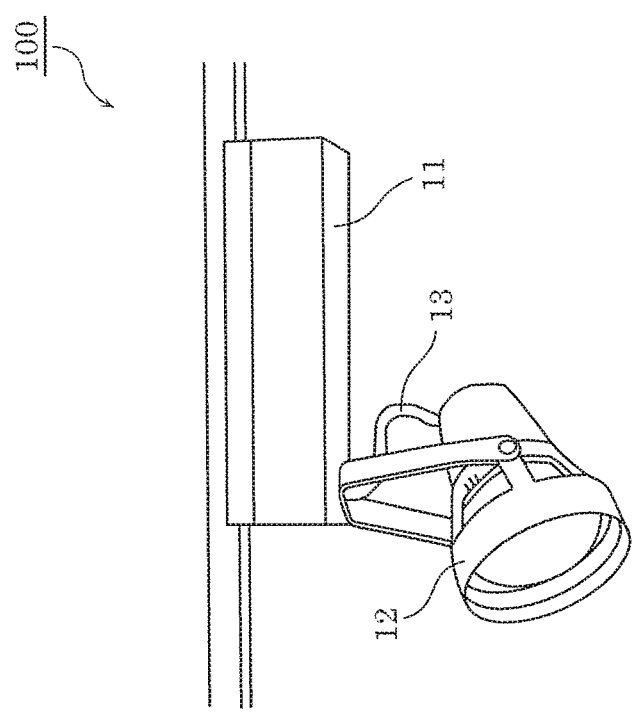
FIG. 11 is a schematic diagram illustrating an appearance of the luminaire according to Embodiment 3.

It should be noted that luminaire 100 may be applied to another luminaire such as a spotlight illustrated in FIG. 11.

[Example of Signboard]

Figure 12:
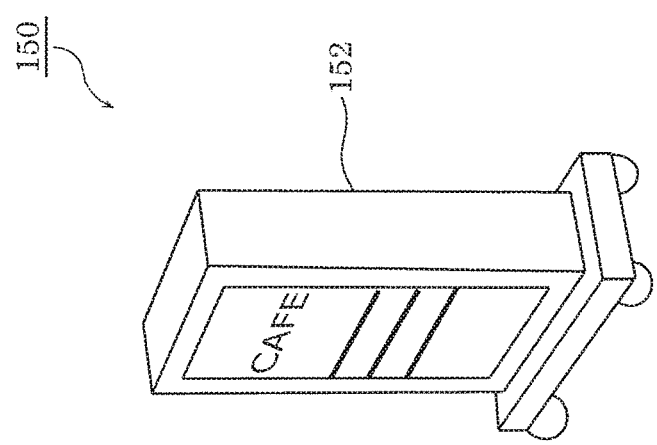
FIG. 12 is a schematic diagram illustrating an appearance of a signboard according to Embodiment 3.

FIG. 12 is an external view of signboard 150 including sign housing 152 incorporating therein lighting device 101 and light-emitting element 102 described in the embodiments. For example, as illustrated in FIG. 12, lighting device 101 is applied to signboard 150 for use in a commercial facility or a store. It should be noted that a type of signboard 150 including lighting device 101 is not limited to the above type. For example, examples of signboard 150 may include a station sign, an information board, and an advertising sign for use in a station or the like.

[Other Variations]

The above-described type of the switching element is an example, and the present disclosure is not limited to this. For example, the switching element may be a MOS transistor, a bipolar transistor, an insulated-gate bipolar transistor (IGBT), a relay, or the like.

Moreover, at least some of processing units included in each of the luminaires or lighting devices according to the aforementioned embodiments are typically achieved as large-scale integrations (LSIs) which are integrated circuits. These may be separately mounted on one chip, or some or all of them may be mounted on one chip.

Moreover, the circuit configurations illustrated in the above-described circuit diagrams are examples, and the present disclosure is not limited to the circuit configurations. In other words, like the circuit configurations, the present disclosure includes circuits capable of serving the characteristic functions of the present disclosure. For example, the present disclosure also includes an element to which a switching element (e.g., transistor), a resistance element, or a capacitative element is connected in series or parallel, to an extent that the same functions as the circuit configurations can be served. In other words, the term "connected" in the aforementioned embodiments is not limited to two terminals (nodes) being directly connected, and includes a case in which the two terminals (nodes) are connected via an element to an extent that the same functions can be served.

Moreover, the logic levels represented as high and low or switching states represented as on and off are exemplified for specifically describing the present disclosure, and a different combination of the exemplified logic levels or switching states can lead to an equivalent result. Furthermore, the configuration of the logic circuit described above is exemplified for specifically describing the present disclosure, and a different logic circuit can achieve an equivalent input and output relationship.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device which supplies a light-emitting element with a current modulated based on a visible light communication signal, the lighting device comprising:
   a DC power supply circuit which supplies the light-emitting element with a first voltage that is a DC voltage; and
   a current control circuit which (i) includes a current control element connected in series to the light-emitting element, (ii) switches the current control element between a first state and a second state based on the visible light communication signal, the first state and the second state differing in electrical impedance, and (iii) adjusts, to a constant current value corresponding to a constant current instruction signal, a current flowing through the light-emitting element in a period in which the current control element is in the first state, by controlling the current control element.

2. The lighting device according to claim 1,
   wherein the visible light communication signal is generated which causes an average current value of the current flowing through the light-emitting element to be constant.

3. The lighting device according to claim 1, further comprising:
   a signal generation circuit which generates a control signal that switches between a high level and a low level with timing based on the visible light communication signal and that has a high-level voltage value corresponding to the constant current instruction signal,
   wherein the current control circuit controls the current control element according to the control signal.

4. The lighting device according to claim 3,
   wherein the current control circuit includes:
      a current detection element for detecting a current flowing through the current control element; and
      an amplifier which amplifies a difference between the control signal and a current signal detected by the current detection element, and
   the current flowing through the current control element is adjusted according to an output signal of the amplifier.

5. The lighting device according to claim 4,
   wherein the current control element is a transistor,
   the current detection element is connected in series to the transistor,
   the amplifier has an inverting input terminal connected to a node between the current detection element and the transistor,
   the control signal is provided to a non-inverting input terminal of the amplifier, and
   the amplifier has an output terminal connected to a control terminal of the current control element.

6. The lighting device according to claim 3,
   wherein the signal generation circuit changes the high-level voltage value of the control signal based on a dimming signal.

7. The lighting device according to claim 1,
   wherein the DC power supply circuit causes a second voltage at a node between the light-emitting element and the current control element to be a constant value by supplying the first voltage.

8. The lighting device according to claim 7,
   wherein the DC power supply circuit supplies the first voltage which causes the second voltage to be greater than an amplitude of a pulsating voltage included in the first voltage.

9. The lighting device according to claim 1,
   wherein the current control circuit includes:
      a current detection element for detecting a current flowing through the current control element; and
      an amplifier which amplifies a difference between the constant current instruction signal and a signal obtained by superimposing the visible light communication signal on a current signal detected by the current detection element, and
   the current flowing through the current control element is adjusted according to an output signal of the amplifier.

10. The lighting device according to claim 1,
    wherein the current control element has greater electrical impedance in the second state than in the first state.

11. The lighting device according to claim 1,
    wherein the current flowing through the light-emitting element in the period in which the current control element is in the first state is greater than a current flowing through the light-emitting element in a period in which the current control element is in the second state.

12. The lighting device according to claim 11,
    wherein no current flows through the light-emitting element in the period in which the current control element is in the second state.

13. The lighting device according to claim 1,
    wherein the constant current value corresponds to a voltage value of the constant current instruction signal.

14. A luminaire comprising:
    the lighting device according to claim 1; and
    the light-emitting element.

15. A signboard comprising:
    a sign housing; and
    the lighting device according to claim 1.

* * * * *